Jan. 8, 1935. G. R. NAPIER 1,986,845
MONORAIL VEHICLE
Filed March 2, 1932
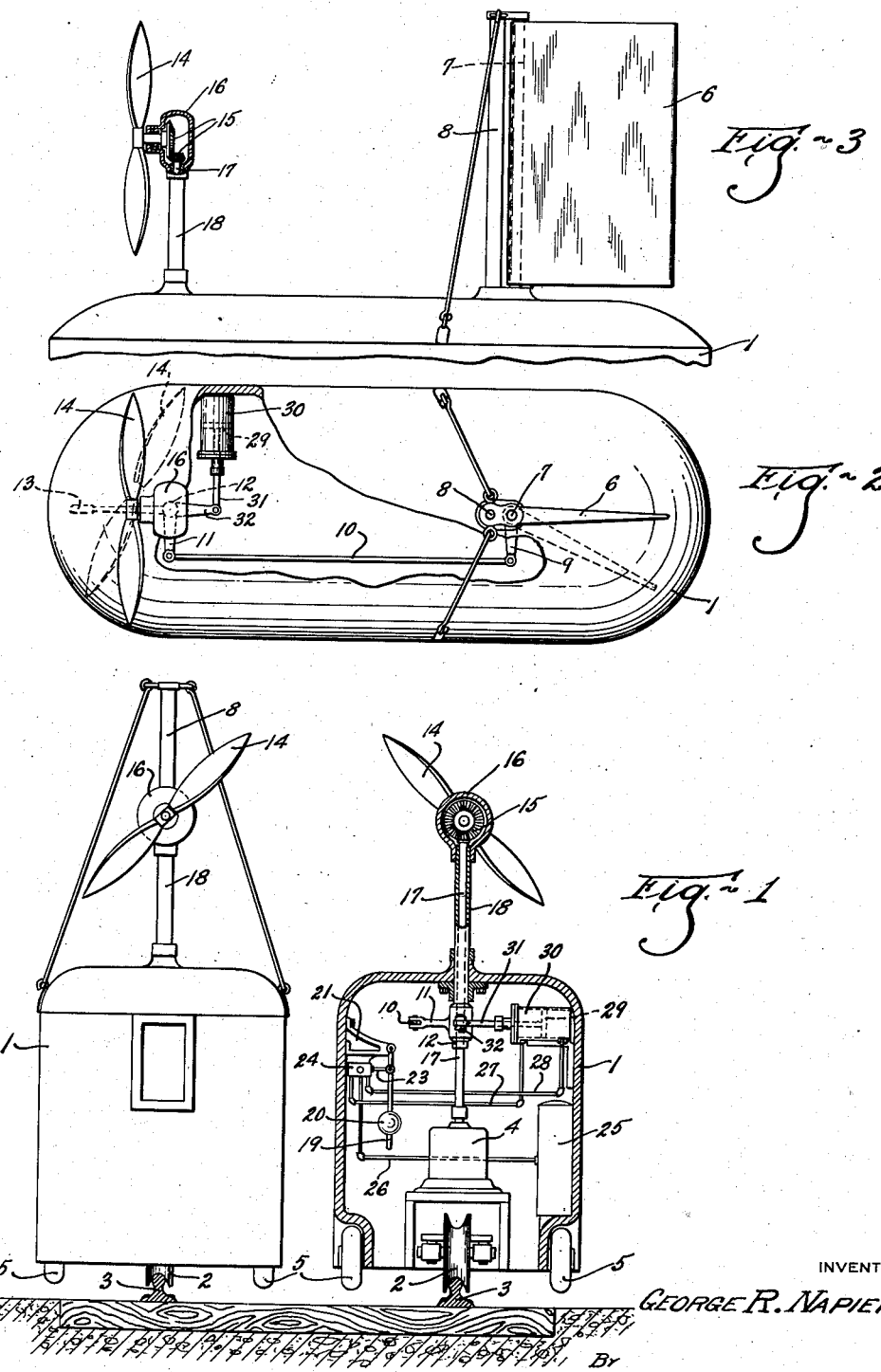
INVENTOR
GEORGE R. NAPIER Patented Jan. 8, 1935

1,986,845

UNITED STATES PATENT OFFICE 1,986,845

MONORAIL VEHICLE

George R. Napier, Cleveland Heights, Ohio

Application March 2, 1932, Serial No. 596,268

6 Claims. (Cl. 105—141)

This invention relates to monorail vehicles and particularly to stabilizing means therefor. The object of the invention is to provide improved means for maintaining upright a vehicle built to travel along a single rail, notwithstanding the fact that the center of gravity of the vehicle as a whole is above and not below the rail.

A further object of the invention is to provide such improved means which is automatic in operation and is governed or controlled by the direction of motion of the vehicle or, more accurately, is made operative by any tendency of the vehicle to depart from a straight path, so that when the monorail turns in one direction or the other the automatic stabilizing mechanism produces the necessary force to counteract any tendency of the vehicle to leave the rail.

Further objects of the invention are in part obvious and in part will appear more in detail hereinafter.

In the drawing, which represents one suitable embodiment of the invention, Fig. 1 illustrates two vehicles on parallel rails, the vehicle on the left being shown in end elevation and that on the right in transverse sectional elevation; Fig. 2 is a plan view partly broken out to expose interior parts; and Fig. 3 is a side elevation of the upper portion of the vehicle.

The invention is capable of application to any type of vehicle adapted to travel on a monorail, or, in other words, in which the path of motion of the vehicle as a whole is governed not by steering mechanism, but by its confinement to the rail which guides its course. For example, the vehicle may be of bi-cycle type adapted to carry one or more persons and propelled either by the muscular effort of the rider or by a power source, such as a gasoline engine or the like. For convenience, however, the invention is shown applied to a passenger car of larger and heavier construction than a bicycle, said car embodying a frame or body 1 provided with one or more wheels 2 resting upon the single rail 3 and which wheels may be driven by a suitable power source, such as the electric or gasoline motor 4. To adapt the invention for practice on railway lines now in operation, the car may be designed of such width that two cars may travel one on each of the two standard rails with proper clearance between them, as shown in Fig. 1. For the purpose of maintaining the car upright when at rest, as at a station platform, it may be provided at each side with one or more idle wheels 5 so mounted as to have their road contacting surfaces in substantially the same horizontal plane with the rail wheels 2, or, indeed, slightly below the same, so that in special cases the car may be removed from the rails and travel upon an ordinary roadbed.

Two forms of stabilizing mechanism or means are shown, either or both of which may be used, as desired. Each thereof, upon any tendency of the vehicle to depart from a straight path, produces an effect upon the vehicle which counteracts its tendency to tilt to one side or to leave the rail.

Possibly the simplest form of stabilizer is the vane 6, which is a more or less strong and rigid sheet-like member made of metal or any other suitable material and of any suitable form or shape, but shown as rectangular, which is mounted to turn on a vertical axis 7, being supported by a post 8 mounted on the vehicle roof. Said vane is provided with means for turning or adjusting it around its axis, such as an arm 9 connected to an extension of the shaft 7 within the car, to which arm 9 operating or controlling means for the vane may be connected, either an operating means adapted for manual operation by the motorman or other car operator or automatically by any suitable mechanism for the purpose. For example, arm 9 may be connected by a link 10 to an arm 11 on a tubular shaft 12, which is provided with a hand lever 13, by operation of which the vane may be turned to one side or the other at the will of the operator.

With such an arrangement, let us assume that the car shown in Fig. 2 is travelling from right to left, so that the vane 6 trails behind its supporting shaft 7. Vane 6 acts somewhat like the rudder of a ship, but not for the purpose of steering the vehicle, because its motion is governed entirely by the rail to which it is confined by the flanges of wheels 2, but said vane acts as a stabilizer for maintaining the vehicle upright. Assume, for discussion, that the track is straight and then, looking forward, takes a turn to the right. As soon as the wheels encounter the first curvature, there is a tendency for the car to tilt to the left, or, in other words, to continue on its former straight path. Just prior to or at the moment of encountering the curve, the car operator turns the handle 13 in the clockwise direction, Fig. 2, tilting the vane to the dotted line position, whereupon the air pressure on the vane produced by car motion applies to the vehicle a force tending to tilt it to the right, causing it to lean inward so long as the vane remains in the dotted line position. It is kept in this position while travelling around the curve and when the track again straightens out the vane is moved back to its upright or middle position shown in full lines. Of course, in manual operation of this vane it will be adjusted more or less in the same manner as the front wheel of a bicycle is adjusted while traveling along the road. Movement of the vane will occur to the same amount or proportion and in the proper direction to meet and cope with any tendency of the car to tilt to one side or the other, so that the net effect will be to maintain the vehicle in stable position upon its trackway.

Naturally, the vane must be of proper size and dimensions in proportion to the weight and speed of the vehicle, as well as other factors.

Instead of the vane 6 I may utilize a propeller or other similar device mounted to turn about a vertical axis, just as with the vane 6. Fig. 3 of the drawing shows such a propeller 14 at the forward end of the car. It is driven through suitable bevel or other gears 15 from the motor 4 and the propeller itself is mounted in a head 16 which turns around the vertical axis of the driving shaft 17 and is coupled to the sleeve 12 extending into the interior of the car and connected to the arm 11 before referred to. Therefore, the same motion of the operating handle 13 before described turns the propeller so that it faces forward diagonally to the right or to the left in the same manner as the vane 6 trails in one way or the other. This propeller is driven by a suitable motor of sufficient power so that while the car is traveling along its rail rotation of the propeller will produce a lateral effect upon the car equivalent to that of the vane 6, tending to right it should it tend to tilt to one side or the other.

Both the propeller and vane may be used at the same time and be subject to operator control, as described.

If desired, the vane and propeller, or either thereof, if used alone, may be automatically controlled by any suitable mechanism, preferably one which is controlled by the direction of movement of the vehicle. The drawing illustrates in Fig. 1 a pendulum 20 supported to swing on a bracket 21 and connected to the stem 23 of a three way valve 24 supplied by fluid pressure, such as air pressure, from a source 25 by way of a pipe 26. Said valve controls the flow of pressure to one or the other of two pipes 27, 28 which supply pressure to opposite sides of a piston 29 working in a cylinder 30 and the rod 31 of which is connected to an arm 32 also connected to the sleeve 18 and therefore to arm 11. With this arrangement, any tilting motion of the vehicle to one side or the other, caused by a curve or change of direction of the track, tilts the pendulum to one side or the other and admits fluid pressure to the cylinder 30, causing the piston 29 to move over and turn the vane and propeller, or whichever one thereof is used, in the proper direction to counteract the tilting tendency. If desired, a manually operated device, such as handle 19, may be used to control the valve 24, so that while a power source turns the stabilizer, it is nevertheless manually controlled.

The arrangement described, of course, is particularly suitable for monorail vehicles in which the center of gravity of the vehicle as a whole is above the track on which it travels, or, in other words, vehicles which normally would have a tendency to fall off the track. However, it may be applied to stable vehicles hung from an overhead support or locked to the rail, in which case the stabilizer simply tends to avoid side swings or tendency of the car to move too freely. The invention further enables monorail systems to be applied to the standard gauge tracks now in use throughout the country.

While I have described the vehicle shown in the drawing as propelled by the motor 4 and a driving wheel 2, it will, of course, be understood that any suitable means of propulsion may be used. Indeed, the same propeller 14 which is used for stabilizing purposes by turning it in one direction or the other, may also be the propeller for the vehicle as a whole, or, any other means of propulsion may be used. Also the wheels 5, which are used for landing purposes or for supports when the car is at rest, may be adjustable vertically so that they can be more or less withdrawn from the roadbed or applied to it by vertical motion, as will be readily understood.

What I claim is:

1. A vehicle of the class described, comprising a body portion provided with supporting wheels and adapted to travel along a single rail, the center of gravity thereof being above the rail, and air propeller means positioned above the body and including vanes rotating about a horizontal axis, the propeller as a whole being adjustable around a vertical axis to produce lateral tilting effect upon the vehicle.

2. A vehicle of the class described, comprising a body portion provided with supporting wheels arranged in a line and adapted to travel along a single rail, the center of gravity thereof being above the rail, and air propeller means including vanes rotating about a horizontal axis, the propeller as a whole being adjustable around a vertical axis to produce lateral tilting effect upon the vehicle, and on a radius to place the propeller wholly within the area of the vehicle body regardless of the position to which the propeller is adjusted.

3. A vehicle of the class described, comprising a body portion provided with supporting wheels and adapted to travel along a single rail, the center of gravity thereof being above the rail, air propeller means positioned above the body and including vanes rotating about a horizontal axis, the propeller as a whole being adjustable around a vertical axis to produce lateral tilting effect upon the vehicle, and means governed by the motion of the vehicle for adjusting the propeller to different positions.

4. A vehicle of the class described, comprising a body portion provided with supporting wheels and adapted to travel along a single rail, the center of gravity thereof being above the rail, air propeller means including vanes rotating about a horizontal axis, the propeller as a whole being adjustable around a vertical axis to produce lateral tilting effect upon the vehicle, a stabilizing vane therefor lying in a vertical plane and tiltable about a vertical axis, and means for adjusting said propeller and said vane simultaneously and in unison.

5. A vehicle of the class described, comprising a body portion provided with supporting wheels and adapted to travel along a single rail, the center of gravity thereof being above the rail, air propeller means including vanes rotating about a horizontal axis, the propeller as a whole being adjustable around a vertical axis to produce lateral tilting effect upon the vehicle, a stabilizing vane therefor lying in a vertical plane and tiltable about a vertical axis, and means governed by motion of the vehicle for adjusting said propeller and said vane simultaneously and in unison.

6. A vehicle of the class described, comprising a body portion provided with supporting wheels and adapted to travel along a single rail, the center of gravity of said vehicle being above the rail, and air propeller means positioned substantially above the center of gravity of the vehicle, the propeller means as a whole being adjustable around a vertical axis to produce lateral tilting effect upon the vehicle.

GEORGE R. NAPIER.